(12) United States Patent
Ilan et al.

(10) Patent No.: US 9,519,514 B2
(45) Date of Patent: Dec. 13, 2016

(54) INTERFACING WITH A BUFFER MANAGER VIA QUEUES

(71) Applicant: Marvell Israel (M.I.S.L) Ltd., Yokneam (IL)

(72) Inventors: Dan Ilan, Herzelia (IL); Alon Rachmani, Rehovot (IL); Michael Weiner, Nes Ziona (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 2 days.

(21) Appl. No.: 14/606,268

(22) Filed: Jan. 27, 2015

(65) Prior Publication Data

US 2015/0212795 A1   Jul. 30, 2015

Related U.S. Application Data

(60) Provisional application No. 61/933,108, filed on Jan. 29, 2014.

(51) Int. Cl.
| | | |
|---|---|---|
| *G06F 12/00* | (2006.01) | |
| *G06F 9/50* | (2006.01) | |
| *G06F 12/08* | (2016.01) | |

(52) U.S. Cl.
CPC ............... *G06F 9/5011* (2013.01); *G06F 9/50* (2013.01); *G06F 9/5016* (2013.01); *G06F 9/5022* (2013.01); *G06F 12/0802* (2013.01); *G06F 12/0888* (2013.01)

(58) Field of Classification Search
CPC .... G06F 12/0888; G06F 12/0802; G06F 9/50; G06F 9/5011; G06F 9/5016; G06F 9/5022
See application file for complete search history.

(56) References Cited

U.S. PATENT DOCUMENTS

| | | | | |
|---|---|---|---|---|
| 7,299,332 | B1 * | 11/2007 | Misra .................... | G06F 9/5016 711/162 |
| 2008/0005404 | A1 * | 1/2008 | Ternovsky .............. | H04L 49/90 710/56 |
| 2011/0219195 | A1 * | 9/2011 | Habusha ................. | G06F 12/08 711/137 |
| 2011/0296063 | A1 * | 12/2011 | Pais .......................... | G06F 5/12 710/56 |

* cited by examiner

*Primary Examiner* — Aracelis Ruiz (57) ABSTRACT

Embodiments include a system on chip (SOC) comprising: a cache; a buffer manager configured to manage a plurality of buffer locations; and a processing core configured to issue a buffer allocation request to the buffer manager to request the buffer manager to allocate one or more buffer locations to the processing core, the buffer manager being further configured to, in response to receiving the buffer allocation request, allocate a first buffer location to the processing core by writing a first buffer pointer associated with the first buffer location to the cache, and the processing core being further configured to obtain the allocation of the first buffer location by reading the first buffer pointer from the cache.

21 Claims, 6 Drawing Sheets

INTERFACING WITH A BUFFER MANAGER VIA QUEUES

CROSS REFERENCE TO RELATED APPLICATIONS

This claims priority to U.S. Provisional Patent Application No. 61/933,108, filed on Jan. 29, 2014, which is incorporated herein by reference in its entirety.

TECHNICAL FIELD

Embodiments of the present disclosure relate to a buffer manager for managing buffer locations, and in particular to interfacing between a processing core and a buffer manager.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A buffer manager generally manages one or more buffer pools, where a buffer pool comprises a plurality of buffer locations. A processing core communicates with the buffer manager, for example, to request allocation of buffer locations to the processing core, and/or to request release of buffer locations that were previously allocated to the processing core.

SUMMARY

In various embodiments, the present disclosure provides a system on chip (SOC) comprising: a cache; a buffer manager configured to manage a plurality of buffer locations; and a processing core configured to issue a buffer allocation request to the buffer manager to request the buffer manager to allocate one or more buffer locations to the processing core, the buffer manager being further configured to, in response to receiving the buffer allocation request, allocate a first buffer location to the processing core by writing a first buffer pointer associated with the first buffer location to the cache, and the processing core being further configured to obtain the allocation of the first buffer location by reading the first buffer pointer from the cache.

In various embodiments, the present disclosure also provides a method comprising: issuing, by a processing core, a buffer allocation request to a buffer manager to request the buffer manager to allocate one or more buffer locations to the processing core; in response to receiving the buffer allocation request, allocating, by the buffer manager, a first buffer location to the processing core by writing a first buffer pointer associated with the first buffer location in a cache; and obtaining, by the processing core, the allocation of the first buffer location by reading the first buffer pointer from the cache.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

DETAILED DESCRIPTION

Figure 1:
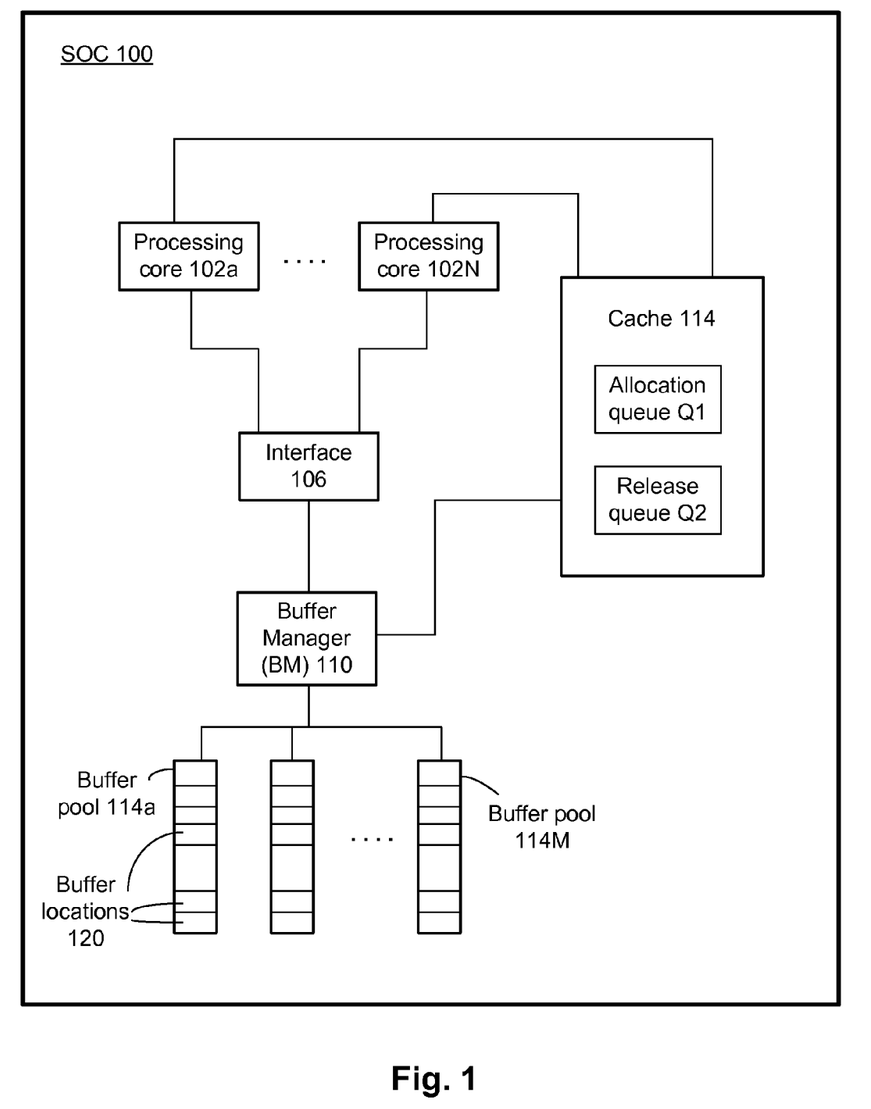
FIG. 1 schematically illustrates a system on chip (SOC) comprising a plurality of processing cores, a buffer manager, a queue, where a processing core at least in part communicates with the buffer manager via the queue, in accordance with an embodiment.

FIG. 1 schematically illustrates a system on chip (SOC) 100 comprising a plurality of processing cores 102a, ..., 102N, a buffer manager 110 (henceforth referred to as "BM 110"), an allocation queue Q1 (henceforth referred to herein as "queue Q1"), and a release queue Q2 (henceforth referred to herein as "queue Q2"), where one or more of the processing cores 102a, ..., 102N at least in part communicate with the BM 110 via one or both of the queues Q1 and Q2.

In an example, at least part of a buffer allocation operation is performed based on communication between the BM 110 and a processing core via the queue Q1, as will be discussed in details herein later. In another example, at least part of a buffer release operation is performed based on communication between the BM 110 and a processing core via the queue Q2, as will be discussed in details herein later. Communicating between the processing cores and the BM 110 via the queues Q1 and Q2, in an example, results in an increase in a speed of communication, as will be discussed in details herein later.

In an embodiment, the SOC 100 further comprises a plurality of buffer pools 114a, ..., 114M. Each buffer pool comprises a plurality of buffer locations. For example, the buffer pool 114a comprises a plurality of buffer locations 120. Although FIG. 1 illustrates the SOC 100 comprising the buffer pools 114a, ..., 114M, in another embodiment (and although not illustrated in FIG. 1), in an embodiment, one or more of the buffer pools 114a, ..., 114M are external to the SOC 100.

The buffer locations included in the buffer pools 114a, ..., 114M, for example, buffer or temporarily store any appropriate information, e.g., data packets, packet descriptors associated with the data packets (e.g., where a packet descriptor associated with a data packet includes various information about the data packet), or any other appropriate type of information.

In an example, the number of buffer locations included in ones of the buffer pools 114a, ..., 114M are different, although, in another example, the number of buffer locations included in ones of the buffer pools 114a, ..., 114M are the same. For example, assume that the buffer pool 114a includes a first number of buffer locations, the buffer pool 114b includes a second number of buffer locations, and so on. In an example, the first and second numbers have equal values. In another example, the first number is different from the second number.

In an embodiment, ones of the buffer locations in the buffer pools 114a, ..., 114M has a corresponding address or identification, which is also referred to herein as a buffer pointer. Thus, a buffer pointer associated with a buffer location is used to uniquely identify the buffer location. As an example, a processing core accesses a buffer location, using an address of the buffer location included in the corresponding buffer pointer.

In an embodiment, the BM 110 manages the buffer locations in the buffer pools 114a, ..., 114M. For example, when a processing core requests access to a buffer location (e.g., to store a data packet in the buffer location), the BM 110 assigns or allocates a buffer location from a buffer pool to the processing core. In another example, after a processing core has been assigned a buffer location and the processing core no longer needs the buffer location (e.g., has already used the buffer location to store a data packet, and no longer needs the data packet to be stored in the buffer location), the processing core requests the BM 110 to release the buffer location—based on such a request, the BM 110 releases the buffer location in the buffer pool, so that the buffer location is made available to be assigned to another component of the SOC 100 (e.g., to another processing core).

In an embodiment, the queues Q1 and Q2 are stored in a cache 114 of the SOC 100. In an embodiment, the cache 114 is a level 1 (L1) cache. In another embodiment, the cache 114 is a level 2 (L2) or a level 3 (L3) cache. Although the two queues Q1 and Q2 illustrated in FIG. 1 are for allocation and release operations, respectively, in an embodiment, the two queues Q1 and Q2 are combined or integrated in a single queue. In an embodiment, the queues Q1 and Q2 are first-in first-out queues.

In an embodiment, the processing cores 102a, ..., 102N communicate with the BM 110 at least in part via an interface 106. In an embodiment, the interface 106 transmits various commands between the processing cores 102a, ..., 102N and the BM 110, as will be discussed in further details herein later. In an example, the interface 106 is a host memory accelerator unit (HMAC). In an example, the interface 106 is integrated or combined with the BM 110.

Although FIG. 1 illustrates a plurality of processing cores, in another embodiment, the SOC 100 comprises a single processing core. Although FIG. 1 illustrates each of the plurality of processing cores being coupled to the BM 110 via the interface 106, in another embodiment, one or more (e.g., but not all) of the plurality of processing cores are coupled to the BM 110.

Figure 2:
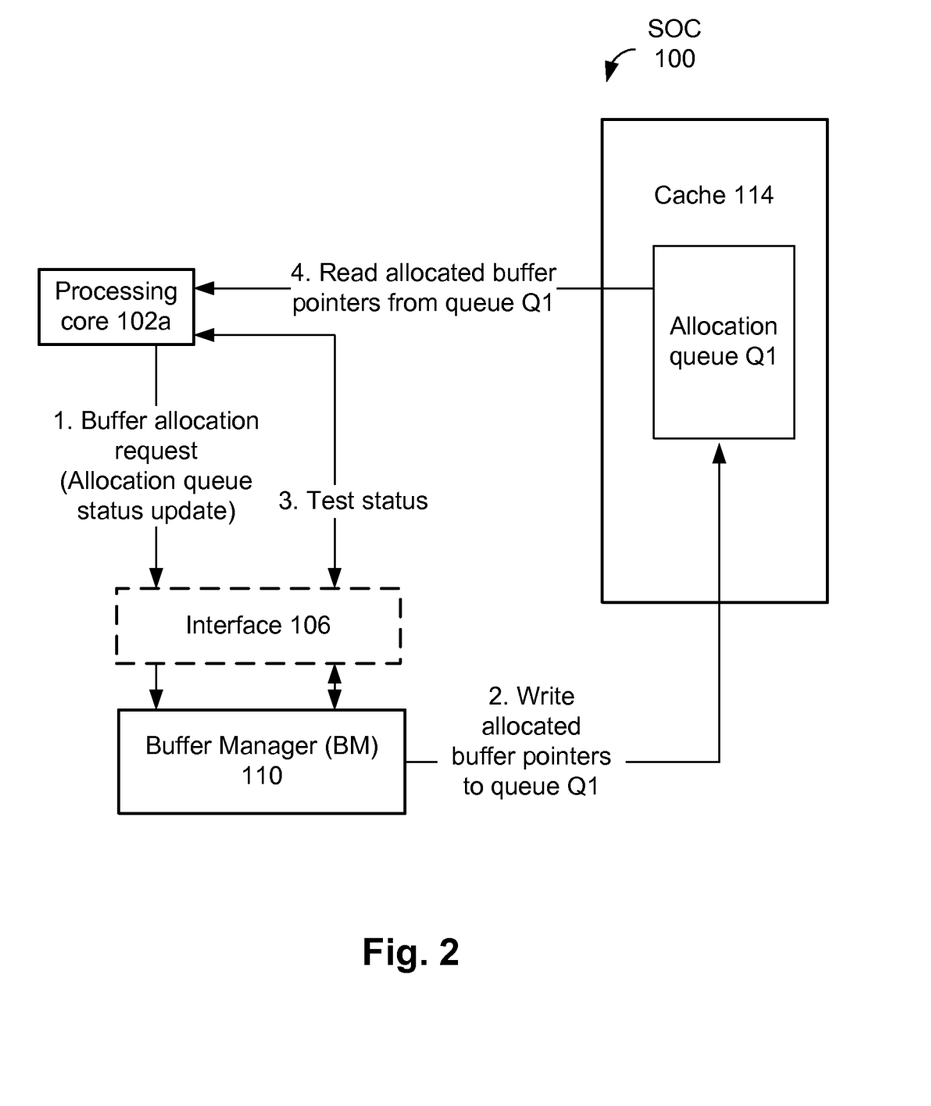
FIG. 2 illustrates an example operation of the SOC of FIG. 1.

FIG. 2 illustrates an example operation of the SOC 100 of FIG. 1. For example, when a processing core needs to store data in one or more buffer locations, the processing core transmits a buffer allocation request to the BM 110. In response, the BM 110 assigns or allocates one or more buffer locations (e.g., from one or more buffer pools) to the processing core, e.g., by transmitting the associated buffer pointers to the processing core. Once the processing core receives the buffer pointers, the processing core assumes that the buffer locations associated with the received buffer pointers have been assigned to the processing core. Accordingly, the processing core stores data in the allocated buffer locations. FIG. 2 is directed to a buffer allocation operation, in which buffer locations are allocated by the BM 110 to an example processing core 102a.

FIG. 2 illustrates only some of the components of the SOC 100, e.g., those components that are relevant to a buffer allocation operation. Also, various operations illustrated in FIG. 2 are numbered, to identify the sequence in which the operations occur. However, in other embodiments, the operations occur in a sequence that is different from the sequence numbers illustrated in FIG. 2.

Referring to FIG. 2, initially, the processing core 102a issues a buffer allocation request, e.g., an allocation queue status update, to request allocation of buffer locations to the processing core 102a. In an embodiment, the buffer allocation request is issued to the interface 106, which in turn transmits the request (or transmits a corresponding but different request) to the BM 110. In another embodiment, the buffer allocation request is issued to the BM 110 directly, by bypassing the interface 106. The interface 106 is illustrated in dotted lines in FIG. 2, as the interface 106, in some example, is selectively bypassed while the processing core 102a communicates with the BM 110; and in some other examples, the processing core 102a communicates with the BM 110 via the interface 106.

Based on the BM 110 receiving the allocation request from the processing core 102a, the BM 110 allocates one or more buffer locations from one or more buffer pools to the processing core 102a. As an example, the BM 110 allocates a batch of buffer locations (e.g., eight buffer locations) to the processing core 102a. As previously discussed herein, each buffer location has a corresponding buffer pointer, which, for example, serves as an address or an identification of the buffer location. The BM 110 allocates the buffer locations to the processing core 102a by, for example, writing the corresponding buffer pointers of the allocated buffer locations to the queue Q1, as illustrated in FIG. 2. The queue Q1, thus, queues the buffer pointers corresponding to the buffer locations that have been allocated to the processing core 102a by the BM 110.

In an embodiment, the processing core 102a checks a status of the buffer allocation request (labeled as "3. Test status" in FIG. 2), to confirm whether the BM 110 has written the allocated buffer pointers to the queue Q1. In an example, the processing core 102a polls the BM 110 and/or the interface 106 to determine if the allocated buffer pointers have been written in the queue Q1. In another example, once the allocated buffer pointers are written in the queue Q1, the BM 110 and/or the interface 106 transmits an acknowledgement to the processing core 102a, indicating that the allocated buffer pointers have been written in the queue Q1.

Subsequently, the processing core 102a reads the allocated buffer pointers from the queue Q1, and determines the buffer locations that have been allocated to the processing core 102a. In an embodiment, the processing core writes information (e.g., data packets, packets descriptors, and/or the like) to the allocated buffer locations.

Figure 3:
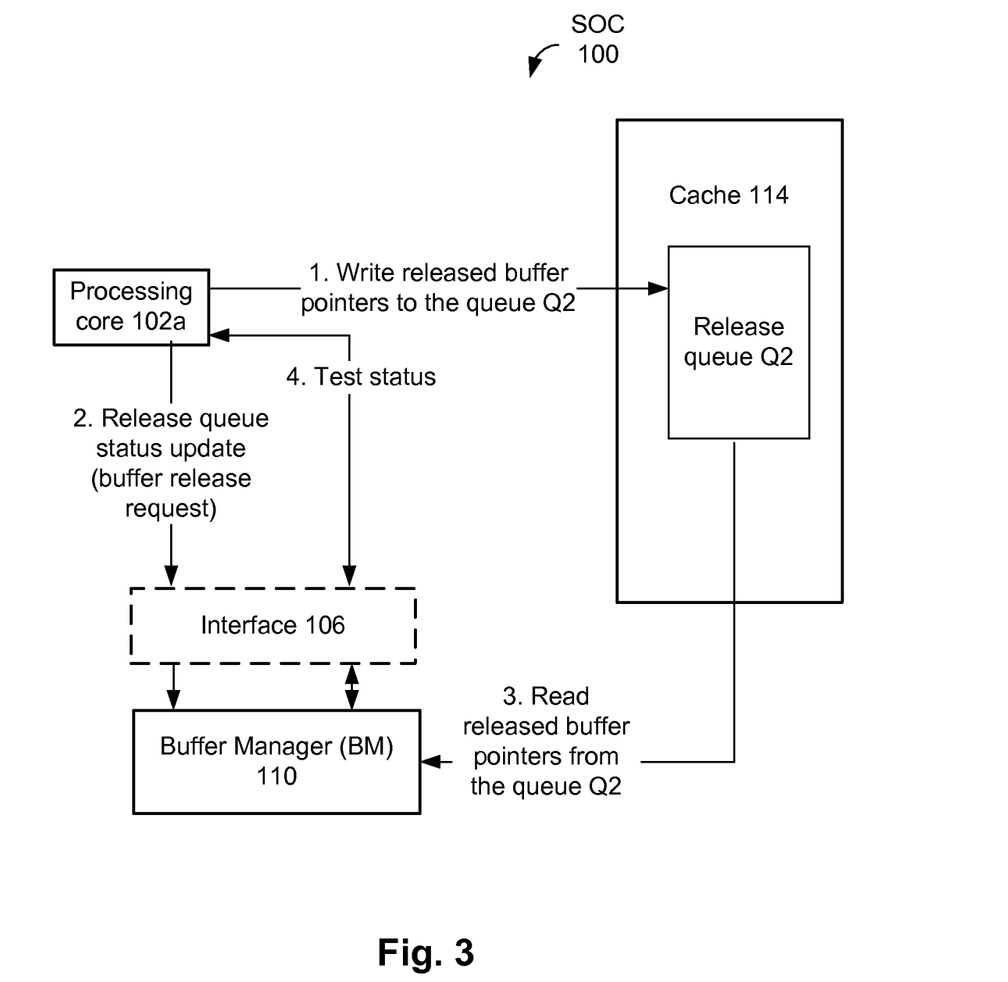
FIG. 3 illustrates another example operation of the SOC of FIG. 1.

FIG. 3 illustrates another example operation (e.g., a buffer release operation) of the SOC 100 of FIG. 1. For example, when one or more buffer locations are assigned to a processing core (e.g., the processing core 102a, as illustrated in FIG. 2), the processing core stores data packets in the allocated buffer locations. When the processing core no longer uses the allocated buffer locations, the buffer locations are released by the processing core, e.g., such that the released buffer locations are available with the BM 110 to be allocated to an appropriate component of the SOC 100 (e.g., to a processing core of the SOC 100), as discussed in more detail herein later with respect to FIG. 3. Thus, FIG. 3 is directed to a buffer release operation, in which buffer locations are released by an example processing core 102a.

FIG. 3 illustrates only some of the components of the SOC 100, e.g., those components that are relevant to a buffer release operation. Also, various operations illustrated in FIG. 3 are numbered, to identify the sequence in which the operations occur. However, in other embodiments, the operations occur in a sequence that is different from the sequence numbers illustrated in FIG. 3.

Referring to FIG. 3, initially, the processing core 102a decides to release one or more buffer locations (e.g., as the processing core 102a no longer needs the one or more buffer locations to store corresponding one or more data packets), and writes the corresponding buffer pointers to the queue Q2. In an example, the processing core 102a releases a batch of buffer locations (e.g., eight buffer locations) to the BM 110, i.e., writes the corresponding buffer pointers to the queue Q2.

Subsequently, the processing core 102a issues a buffer release request, e.g., a release queue status update. In an example, the release queue status update is issued to the interface 106, which in turn transmits the update (or transmits another corresponding request) to the BM 110. In another example, the release queue status update is issued to the BM 110, e.g., by bypassing the interface 106.

Once the BM 110 is aware of the release queue status update, the BM 110 reads the released buffer pointers from the queue Q2. Subsequently, based on reading the buffer pointers, the BM 110 releases the corresponding buffer locations. For example, the BM 110 releases the corresponding buffer locations by making these buffer locations available for future allocation to any appropriate component of the SOC 100. For example, the BM 110 marks or labels these buffer pointers (e.g., by setting a flag) as being available for future allocation to any appropriate component of the SOC 100.

In an embodiment, the processing core 102a checks a status of the buffer release request (labeled as "4. Test status" in FIG. 3), to confirm whether the BM 110 has read the contents from the queue Q2. In an example, the processing core 102a polls the BM 110 and/or the interface 106 to determine if the buffer pointers have been read from the queue Q2. In another example, once the buffer pointers are read from the queue Q2, the BM 110 and/or the interface 106 transmits a confirmation to the processing core 102a, indicating that the buffer pointers have been read from the queue Q2. In an embodiment, once the processing core 102a receives such a confirmation, the processing core 102a initiates another buffer release operation, if necessary (e.g., by writing buffer pointers associated with the another buffer release operation to the queue Q2).

In FIG. 2, the BM 110 allocates buffer locations to the processing core 102a; and in FIG. 3, the processing core 102a releases the buffer locations back to the BM 110, where the allocated buffer locations are managed by the BM 110. In an embodiment, a processing core (e.g., the processing core 102a) also manages one or more buffer locations (e.g., one or more buffer pools that comprise one or more buffer locations). For example, the processing core 102a allocates one or more buffer locations to one or more components of the SOC 100. For example, the processing core 102a allocates one or more buffer locations to the BM 110, or to any other appropriate component of the SOC 100. Once the use of the allocated buffer locations is over, the buffer locations need to released to the processing core 102a (e.g., to enable the processing core 102a to recycle these buffer locations, i.e., make these buffer locations available for allocation to other components of the SOC 100). For example, assume that the processing core 102a allocates a buffer location for buffering a data packet, e.g., allocates the buffer location to an input/output (I/O) component of the SOC 100, and the data packet is stored by the I/O component in the allocated buffer location. Once the data packet is transmitted from the buffer location (e.g. transmitted over a network, processed by a component of the SOC 100, etc.), the I/O component no longer needs to store the data packet in the buffer location, and accordingly, the I/O component releases the buffer location to the BM 110. As the buffer location is managed by the processing core 102a, the BM 110 needs to release the buffer location to the processing core 102a (e.g., to enable the processing core 102a to recycle these buffer locations, i.e., make these buffer locations available for allocation to other components of the SOC 100). It is to be noted that the release operation discussed herein is different from the release operation discussed with respect to FIG. 3. For example, in FIG. 3, the processing core 102a releases buffer locations (e.g., which are managed by the BM 110) to the BM 110; whereas in the scenario discussed herein above, the buffer locations (e.g., which are managed by the processing core 110) are released by the BM 110 to the processing core 110.

Figure 4:
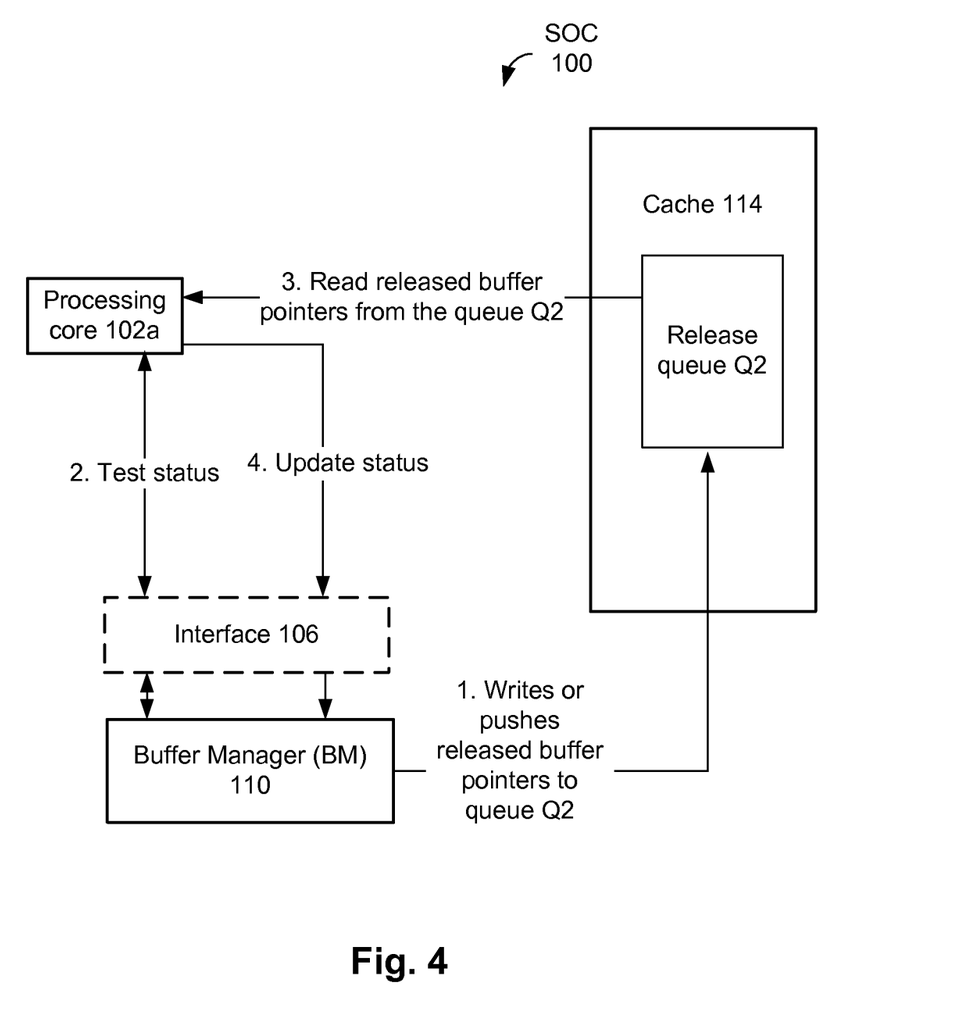
FIG. 4 illustrates another example operation of the SOC of FIG. 1.

FIG. 4 illustrates another example operation (e.g., a buffer release operation) of the SOC 100 of FIG. 1, where the BM 110 releases a plurality of buffer locations to an example processing core 102a of the SOC 100. For example, the buffer locations released in FIG. 4 are managed by the processing core 102a, and the processing core 102a previously assigned these buffer locations to various components (e.g., an I/O component, the BM 110, etc.) of the SOC 100. FIG. 4 illustrates only some of the components of the SOC 100, e.g., those components that are relevant to a buffer release operation. Also, various operations illustrated in FIG. 4 are numbered, to identify the sequence in which the operations occur. However, in other embodiments, the operations occur in a sequence that is different from the sequence numbers illustrated in FIG. 4.

Referring to FIG. 4, initially, the BM 110 decides to release one or more buffer locations to the example processing core 102a, and writes the corresponding buffer pointers (e.g., pushes the buffer pointers) to the release queue Q2 (although, in another embodiment, the buffer pointers are written to a dedicated queue that is (i) different from the queue Q2 and (ii) queues buffer pointers released from the BM 110 to the processing core 102a). In an example, the BM 110 releases a batch of buffer locations (e.g., eight buffer locations) to the processing core 102a, i.e., writes the corresponding buffer pointers to the queue Q2.

Subsequently, the processing core 102a performs a test status operation (e.g., by communicating with the interface 106 and/or the BM 110), to ascertain if the BM 110 has released any buffer locations to the processing core 102a.

In response to determining that the BM 110 has released one or more buffer locations to the processing core 102a, the processing core 102a reads the released buffer pointers from the queue Q2. Based on reading the buffer pointers form the queue Q2, the processing core 102a releases the associated buffer locations (e.g., by making these buffer locations available for future allocation to any appropriate component of the SOC 100). For example, the processing core 102a marks or labels these buffer pointers (e.g., by setting a flag) as being available for future allocation to any appropriate component of the SOC 100. Furthermore, the processing core 102a transmits an update status to the BM 110, e.g., to update the BM 110 that the processing core 102a has read the buffer pointers from the queue Q2 (e.g., t enable the BM 110 to write the next batch of released buffer pointers to the queue Q2).

Interfacing between a processing core and the BM 110 via queues Q1 and Q2, for example, makes communication between the processing core and the BM 110 relatively faster. For example, in a conventional system, when a processing core requests a buffer manager for buffer allocation, the buffer manager transmits an allocated buffer pointer to the processing core directly (e.g., without routing such buffer pointers via a queue). Such direct communication of buffer pointers between the buffer manager and the processing core has relatively higher overhead (e.g., for such communication, the buffer manager and the processing core have to be simultaneously available, and the increase in overhead is also due to tasks such as lock and status test). In contrast, in the SOC 100 of FIGS. 1-3, the processing core 102a and the BM 110 communicates buffer pointers via the queues Q1 and Q2, thereby making such communication relatively faster and with relatively less overhead (e.g., because for such communication via the queues Q1 and Q2, the BM 110 and the processing core 102a need not have to be simultaneously available, and accordingly, for example, tasks such as lock and status test are redundant, thereby eliminating the relatively higher overhead experienced by the conventional system).

FIGS. 1-4 illustrate the interface 106 interfacing between the processing cores 102a, . . . , 102N and the BM 110. However, in another embodiment, the interface 106 interfaces the processing cores 102a, . . . , 102N with one or more other appropriate components of the SOC 100.

Figure 5:
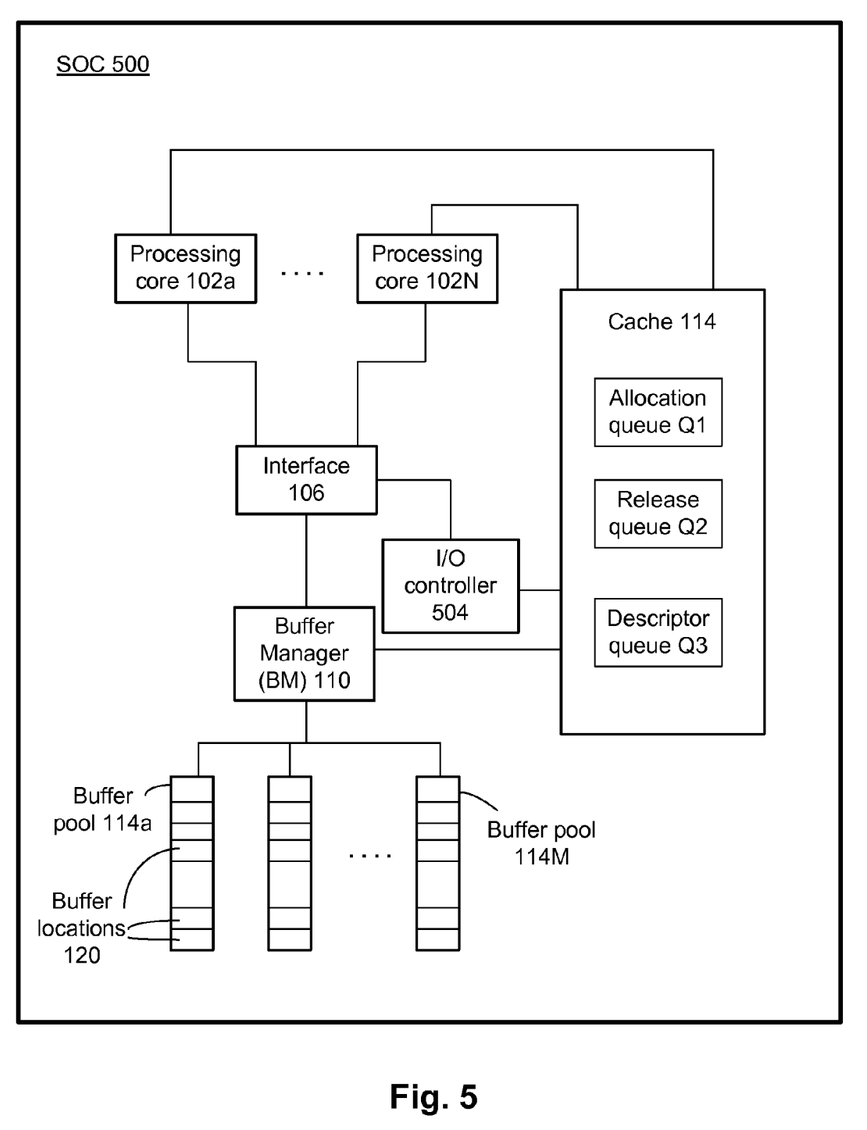
FIG. 5 schematically illustrates an example SOC, in accordance with another embodiment.

For example, FIG. 5 schematically illustrates a SOC 500 comprising the plurality of processing cores 102a, . . . , 102N, the BM 110, the interface 106, and an input/output (I/O) controller 504. Various components of the SOC 500 are at least in part similar to the components of the SOC 100. However, in the SOC 500, the interface 106 is configured to interface the processing cores 102a, . . . , 102N with the BM 110 and also with the I/O controller 504. In an embodiment, the I/O controller 504 is of any appropriate type, e.g., an Ethernet networking interface controller, or the like. In an example, the I/O controller 504 controls one or more I/O components, e.g., an Ethernet port.

Furthermore, in the SOC 500, in addition to the queues Q1 and Q2, the cache 114 comprises a descriptor queue Q3 (henceforth referred to as "queue Q3"). In an example, a structure of the queue Q3 is similar to the structures of the queues Q1 and Q2. In an embodiment, the queue Q3 queues packet descriptors that are, for example, communicated between the I/O controller 504 and one or more of the processing cores 102a, . . . , 102N. In an example, a packet descriptor associated with a data packet is a data structure that is configured to represent the data packet for the purpose of processing, while the data packet is stored, and is further configured to contain selected header information from the data packet, without the packet payload. In an example, the packet descriptor associated with a data packet comprises one or more attributes of the data packet, e.g., a type of the data packet, header information of the data packet, a size of the data packets, and/or the like.

In an example, communicating, via the queue Q3, the packet descriptors between the I/O controller 504 and one or more of the processing cores 102a, . . . , 102N makes such communication relatively faster (e.g., compared to communicating the packet descriptors directly between the I/O controller 504 and one or more of the processing cores 102a, . . . , 102N). For example, such communication via the queue Q3 eliminates the need of the I/O controller 504 and the processing cores to be simultaneously available for communicating, and accordingly, for example, tasks such as lock and status test are redundant.

Figure 6:
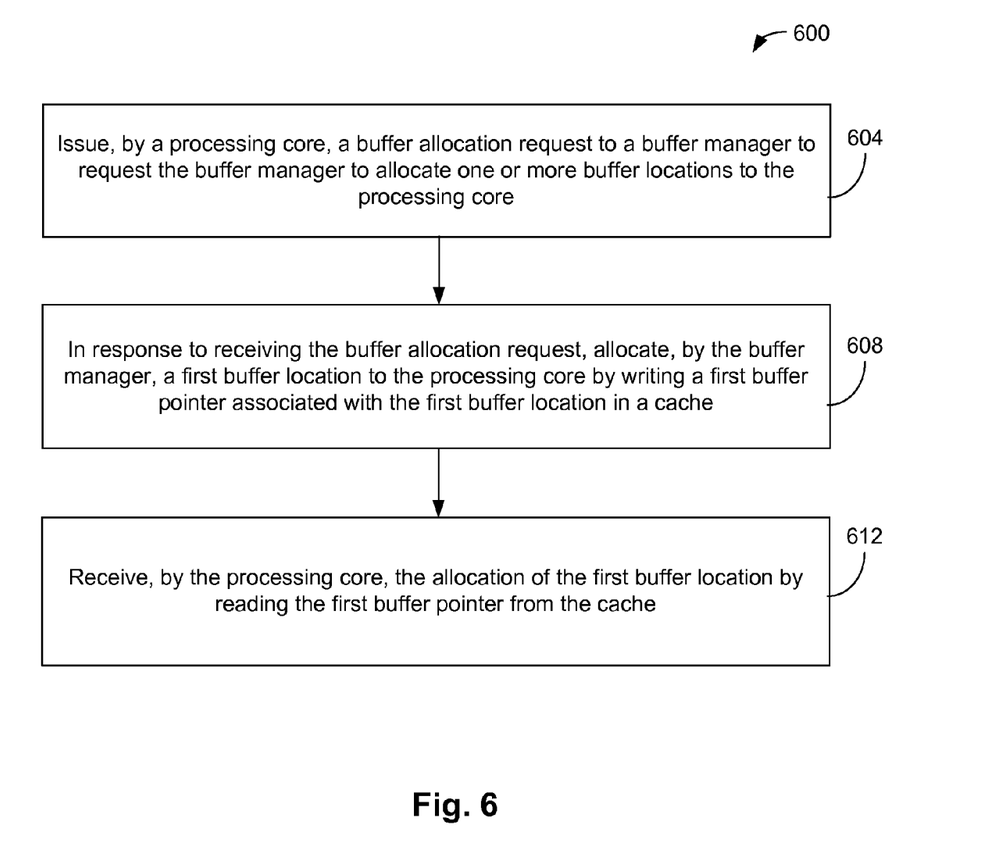
FIG. 6 is a flow diagram of an example method for interfacing between a buffer manager and a processing core.

FIG. 6 is a flow diagram of an example method 600 for interfacing between a buffer manager (e.g., the BM 110 of FIGS. 1-5) and a processing core (e.g., the processing core 102a of FIGS. 1-5). At 604, the processing core issues a buffer allocation request to the buffer manager to request the buffer manager to allocate one or more buffer locations to the processing core. At 608, in response to receiving the buffer allocation request, the buffer manager allocates a first buffer location to the processing core by writing a first buffer pointer associated with the first buffer location in a cache (e.g., in the queue Q1 included in the cache 114). At 612, the processing core obtains the allocation of the first buffer location by reading the first buffer pointer from the cache.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A system on chip (SOC) comprising:
   a cache;
   a buffer manager configured to manage a plurality of buffer locations; and
   a processing core configured to issue a buffer allocation request to the buffer manager to request the buffer manager to allocate one or more buffer locations to the processing core, the buffer manager being further configured to, in response to receiving the buffer allocation request, allocate a first buffer location to the processing core by writing a first buffer pointer associated with the first buffer location to the cache, the processing core being further configured to receive an indication from the buffer manager that the first buffer location has been allocated to the processing core by the first buffer pointer being written to the cache, and the processing core being further configured to obtain the allocation of the first buffer location by reading the first buffer pointer from the cache.

2. The SOC of claim 1, wherein the processing core is further configured to, based on the first buffer location being allocated to the processing core, store information in the first buffer location allocated by the buffer manager.

3. The SOC of claim 2, wherein the processing core is further configured to store the information in the first buffer location allocated by the buffer manager, the information comprising one of a data packet or a packet descriptor associated with the data packet.

4. The SOC of claim 1, wherein the first buffer pointer comprises an address of the first buffer location, and wherein the processing core is further configured to access the first buffer location using the address of the first buffer location included in the first buffer pointer read by the processing core.

5. The SOC of claim 1, wherein the cache is a level 1 (L1) cache.

6. The SOC of claim 1, wherein:
   the processing core is further configured to request release of a second buffer location, which was previously allocated to the processing core by the buffer manager, by writing a second buffer pointer associated with the second buffer location in the cache; and
   the buffer manager is further configured to (i) read the second buffer pointer from the cache and (ii) release the second buffer location by making the second buffer location available for allocation to an appropriate component of the SOC.

7. The SOC of claim 6, wherein:
the buffer manager is further configured to write the first buffer pointer associated with the first buffer location in a first queue in the cache; and
the processing core is further configured to write the second buffer pointer associated with the second buffer location in a second queue in the cache, the second queue being different from the first queue.

8. The SOC of claim 6, wherein ones of the first queue and the second queue are first-in first-out (FIFO) queues.

9. The SOC of claim 1, further comprising:
a plurality of processing cores; and
ones of the plurality of processing cores are respectively configured to transmit corresponding buffer allocation requests to the buffer manager and to request the buffer manager to allocate one or more corresponding buffer locations to the corresponding processing cores.

10. The SOC of claim 1, further comprising:
an interface configured to (i) receive the buffer allocation request from the processing core and (ii) re-transmit the buffer allocation request to the buffer manager.

11. The method of claim 1, further comprising:
transmitting, by ones of a plurality processing core, corresponding buffer allocation requests to the buffer manager to request the buffer manager to allocate one or more corresponding buffer locations to the corresponding processing cores.

12. A method comprising:
issuing, by a processing core, a buffer allocation request to a buffer manager to request the buffer manager to allocate one or more buffer locations to the processing core;
in response to receiving the buffer allocation request, allocating, by the buffer manager, a first buffer location to the processing core by writing a first buffer pointer associated with the first buffer location in a cache;
determining, by the processing core, that one or more buffer pointers have been written in the cache in response to the buffer allocation request; and
in response to determining, by the processing core, that one or more buffer pointers have been written in the cache, obtaining, by the processing core, the allocation of the first buffer location by reading the first buffer pointer from the cache.

13. The method of claim 12, further comprising:
based on the first buffer location being allocated to the processing core, storing, by the processing core, information in the first buffer location.

14. The method of claim 13, wherein storing information in the first buffer location comprises:
storing, by the processing core, information in the first buffer location such that the information comprises one of a data packet or a packet descriptor associated with the data packet.

15. The method of claim 12, wherein allocating the first buffer location comprises:
allocating the first buffer location to the processing core by writing the first buffer pointer associated with the first buffer location in the cache such that the first buffer pointer comprises an address of the first buffer location,
wherein the method further comprises:
accessing, by the processing core, the first buffer location using the address of the first buffer location included in the first buffer pointer.

16. The method of claim 12, wherein allocating the first buffer location comprises:
allocating the first buffer location to the processing core by writing the first buffer pointer associated with the first buffer location in the cache that is a level 1 (L1) cache.

17. The method of claim 12, further comprising:
requesting, by the processing core, release of a second buffer location that was previously allocated to the processing core by the buffer manager, the requesting comprising writing a second buffer pointer associated with the second buffer location in the cache;
reading, by the buffer manager, the second buffer pointer from the cache; and
releasing, by the buffer manager, the second buffer location by making the second buffer location available for allocation to an appropriate component of the SOC.

18. The method of claim 17, wherein:
writing the first buffer pointer comprises writing the first buffer pointer associated with the first buffer location in a first queue in the cache; and
writing the second buffer pointer comprises writing the second buffer pointer associated with the second buffer location in a second queue in the cache, the second queue being different from the first queue.

19. The method of claim 17, wherein:
writing the first buffer pointer comprises writing the first buffer pointer in the first queue that is a first-in first-out (FIFO) queue; and
writing the second buffer pointer comprises writing the second buffer pointer in the second queue that is a FIFO queue.

20. The method of claim 12, wherein transmitting the buffer allocation request comprises:
transmitting, by the processing core, the buffer allocation request to an interface; and
transmitting, by the interface, the buffer allocation request to the buffer manager.

21. The method of claim 12, wherein determining, by the processing core, that one or more buffer pointers have been written in the cache further comprises:
polling, by the processing core, the buffer manager to determine that one or more buffer pointers have been written in the cache.

* * * * *